United States Patent [19]

Guerro et al.

[11] Patent Number: 4,605,702

[45] Date of Patent: Aug. 12, 1986

[54] TEMPORARY WET STRENGTH RESIN

[75] Inventors: Gerald J. Guerro, Trumbull; Robert J. Proverb, Danbury, both of Conn.; Robert F. Tarvin, Roswell, Ga.

[73] Assignee: American Cyanamid Company, Stamford, Conn.

[21] Appl. No.: 625,339

[22] Filed: Jun. 27, 1984

[51] Int. Cl.$^4$ .............................................. C08F 8/28
[52] U.S. Cl. .............................. 525/154; 525/328.2; 525/328.3; 525/328.4
[58] Field of Search .............. 525/154, 328.2, 328.3, 525/328.4

[56] References Cited

U.S. PATENT DOCUMENTS

| | | | |
|---|---|---|---|
| 3,966,694 | 6/1976 | Espy et al. ................... | 525/328.3 |
| 3,992,345 | 11/1976 | Dumas ........................... | 525/328.3 |
| 4,051,088 | 9/1977 | Reid .............................. | 525/154 |
| 4,079,043 | 3/1978 | Rave .............................. | 525/154 |
| 4,122,071 | 10/1978 | Moriya et al. ................ | 525/328.4 |

*Primary Examiner*—Joseph L. Schofer
*Assistant Examiner*—Bernard Lipman
*Attorney, Agent, or Firm*—Frank M. Van Riet

[57] ABSTRACT

A cationic, water-soluble acrylamide polymer containing an acrylamide, a cationic comonomer and, optionally, a second comonomer and having sufficient glyoxal-reactive amide substituents and —$CH_OHCHO$ substituents to be thermosetting, the polymer, before glyoxylation, having a molecular weight ranging from about 500 to about 6000, a process for imparting temporary wet strength to paper and the paper per se, are disclosed.

6 Claims, No Drawings

TEMPORARY WET STRENGTH RESIN

BACKGROUND OF THE INVENTION

U.S. Pat. No. 3,556,392 discloses the production of water-soluble acrylamide polymers which are thermosetting by reason of a reactive content of glyoxal therein. These polymers are said to impart wet strength to paper when applied thereto and to possess the advantageous property of losing a part of said wet strength when said paper is soaked in water. While the ability of these wet-strength papers to lose their wet strength upon soaking in water is important, the more wet strength which can be lost, the better. The paper of said patent is disclosed as losing only 50% of its wet strength upon soaking in water at room temperature for 30 minutes. In order to the paper produced according to U.S. Pat. No. 3,556,392 to lose more than 50% of its wet strength, it is necessary that the water in which the paper is soaked be alkaline. However, it is of course highly improbable that water in which the paper is soaked by the consumer in the disposal of facial tissue, paper toweling, toilet tissue etc. will be alkaline. Therefore, efforts continue to develop polymeric systems which will impart temporary wet strength to paper but lose as much of that wet strength as possible upon exposure thereof to neutral water.

U.S. patent application Ser. No. 532,912, filed Aug. 16, 1983, now pending, discloses an improvement over the wet strength paper achieved by practicing the process of the above-referenced U.S. patent. This application discloses a polymeric system wherein a glyoxylated vinylamide polymer is reacted with a strong base at a pH of about 8.5 to 11 and thus requires an additional reaction over and above that required in the process of U.S. Pat. No. 3,556,392. The reaction with the strong base is very slow, oftimes consuming as many as 15-16 hours before complete.

Accordingly, the search for polymers which impart satisfactory wet strength to paper and still possess the ability to loss that wet strength upon soaking in neutral water at room temperature for short periods of time continues throughout the paper-making industry.

SUMMARY OF THE INVENTION

The present invention comprises a novel copolymer produced from an acrylamide and a cationic comonomer which copolymer is glyoxylated as is taught in the above referenced U.S. patent. The copolymers hereof, however, are of very low molecular weight before glyoxylation. These low molecular weight copolymers have unexpectedly been found to impart wet strength to paper after glyoxylation in the manner of their high molecular weight counterparts however, when paper treated with the copolymers of the present invention are immersed in neutral water, then impact strength materially and rapidly deteriorates, thereby enabling the paper to be discarded or reused in the paper making process.

Accordingly, the present invention also encompasses a process for imparting wet strength to paper and the wet strength paper per se.

DESCRIPTION OF THE INVENTION INCLUDING PREFERRED EMBODIMENTS

This invention is directed to a cationic, water-soluble acrylamide copolymer containing (a) from about 70-99%, by weight, based on the total weight of the copolymer, of an acrylamide and (b) from about 1-30%, by weight, same basis, of a cationic monomer or mixture of cationic monomers copolymerizable with said acrylamide, up to about 10%, by weight, same basis, of said acrylamide being replaced by (c) a different comonomer copolymerizable with said acrylamide, the amount of said (c) being less than said (b) if said (c) is anionic, said acrylamide copolymer having a molecular weight ranging from about 500 to about 6000 before glyoxylation and having sufficient glyoxal-reactive amide substituents and —CH HCHO substituents to be thermosetting, the ratio of glyoxal units to acrylamide units ranging from about 0.1-0.5: 1.0, respectively.

The novel copolymers of the present invention may contain, as the major component thereof, any acrylamide such as acrylamide per se, methacrylamide or the like. The amount of the acrylamide in the copolymer preferably ranges from about 75 to about 95%, by weight.

The cationic comonomer which may be employed herein comprises any known cationic monomer which is copolymerizable with an acrylamide. Useful comonomers include 2-vinylpyridine, 2-vinyl-N-methyl pyridinium chloride, dialkyldimethyl ammonium chloride, (p-vinylphenyl)-trimethyl ammonium chloride, 2-(dimethylamino) ethyl acrylate, methacrylamidotrimethyl ammonium chloride and the like. It is preferred to employ copolymers containing from about 5 to about 25%, by weight, of the cationic comonomer. Mixtures of these comonomers in concentrations within the above limits may also be used.

Up to about 10% by weight, of the acrylamide comonomer of the novel polymers of the present invention may be replaced by other comonomers copolymerizable with the acrylamide. Such comonomers include acrylic acid, acrylic esters such as ethyl acrylate, methylmethacrylate etc., acrylonitrile, styrene vinylvenzene sulfonic acid and the like. Since the final copolymer must be cationic, the only criteria with respect to these comonomers is that they cannot be present in the polymer in amounts greater than cationic comonomer if they are anionic in character.

The acrylamide monomer content of the polymers hereof provides the sites to which the glyoxal substituents are attached after glyoxylation. The amount of these substituents and the —CH$_0$HCHO substituents resulting from the glyoxylation must be sufficient so as to render the resultant copolymer thermosetting, as is described in the above-referenced U.S. patent.

The reaction of the glyoxal with the low molecular weight polymer backbone may be performed as is disclosed in the above-referenced U.S. patent, the pertinent portions thereof hereby being incorporated herein by reference. It is required that from about 10 to about 50 mole percent of glyoxal be reacted with the copolymer backbone per 100 mole percent of acrylamide units available. That is to say, the ratio of glyoxal to acrylamide units in the glyoxylated copolymer should range from about 0.1-0.5 to 1, respectively, preferably from about 0.2 to 0.4 to 1.

The copolymer backbones with which the glyoxal is reacted are best prepared by the aqueous redox polymerization of the comonomers in the presence of a mercapton chainstopper such as 2-mercaptoethanol; hydroxyethyl-3-mercaptopropionate and the like.

The novel copolymers of the present inventions are applied to the paper in any suitable manner as is known in the art such as by spraying of an aqueous solution thereof onto the paper per se or, preferably, by incorporation of the copolymer in the furnish at the wet end of the papermaking process. The copolymers may be applied in amounts sufficient to impart wet strength to the paper i.e. a wet strengtheningly effective amount. It has been found that amounts as little as 4 pounds per ton are oftimes effective in imparting the desired wet strength to the paper, with amounts ranging from about 4–10 pounds per ton, preferably from about 6–8 pounds per ton, being useful.

The paper products produced in accordance with the present invention have exhibited wet strength losses upon immersion in neutral water at room temperature of greater than 60% and oftimes greater than 70%.

The following examples are set forth for purposes of illustration only and are not to be construed as limitations on the present invention except as set forth in the appended claims. All parts and percentages are by weight unless otherwise specified.

EXAMPLE 1

Copolymer Backbone

A suitable 3-necked reaction vessel, equipped with a Claisen adaptor, reflux condensor (the exit of which was connected to a bleach trap), mechanical stirrer, thermometer, argon sparge and inlet with serum cap is charged with 1445 parts of 49% acrylamide, 1828 parts of water and 295.8 parts of 59.8% diallyldimethyl ammonium chloride. The pH is adjusted to 4.0+0.2 with 10% sulfuric acid. The solution is sparged with argon while stirring for 50 minutes. To tahe vessel is then charged 80.01 parts of the 2-mercapto-ethanol. Sparging is continued for ten minutes and is then interrupted. At once is added 17.78 parts of ammonium persulfate in 115.07 parts of water. An exotherm ensues, the maximum temperature of which 71° C. is achieved within three minutes. A heating bath is used to maintain the vessel at 71° C. for the remainder of the reaction. Forty-five minutes after initial catalyst charge, a booster catalyst, consisting of 7.08 parts each of ammonium persulfate and sodium metabisulfite, is added to the solution. Two separate streams are used. Booster addition catalyst time is 65 minutes. After 3.5 hours, the heating bath is removed and the solution allowed to cool. The resultant copolymer has a molecular weight of 1900.

Glyoxalation

At ambient temperatures, 970. parts of the backbone prepared above are treated with 171.5 parts of 40% glyoxal, in a suitable 3-necked vessel equipped with a mechanical stirrer. While stirring, the pH is adjusted to 8.0 and maintained at this level with 10% sodium hydroxide. The viscosity is monitored using a Gardner Bubble Viscometer until a level of B+ is achieved. The reaction is then quenched by the addition of 10% h$_2$SO$_4$, until a pH of 3.20+0.2 is reached. Total time for the reaction is 5.7 hours.

To an aqueous pulp at 0.5% consistency, and pH 6.5 composed of 1:1, hardwood:softwood fibers beaten to C.S.F. of 480 ml. is added sufficient of the glyoxylated copolymer solution of Example 1 to provide a dosage level of ten pounds of resin per ton of furnish. The pulp pH is adjusted to 6.5 and the mixture is then stirred briefly to permit absorption of the resin onto the fiber. From this mixture is then produced several eight inch by eight inch, seventy-pound basis weight handsheets using a stationary deckle Noble and Wood papermaking machine. The web is pressed between blotters and dried on a rotary drum drier at a temperature of 240° F. Tensile testing of paper thusly formed is accomplished according to TAPPI Test Methods #T 456, UM 453. The results are set forth in Table I, below. The % Decay is determined by soaking the treated paper in water at pH 7.0 for 16 hours.

TABLE I

| | Handsheet Testing Results | | | |
| | Dosage | Tensile Wet Strength | | |
| Resin | (lb/T) | Immediate | 16 hr. Soak | % Decay |
|---|---|---|---|---|
| Commercially available wet-strength resin produced as in U.S. 3,556,932 | 5 | 3.23 | 1.47 | 54.5 |
| Example 1 | 10 | 2.14 | 0.76 | 64.5 |
| | 20 | 3.13 | 0.97 | 69.0 |

EXAMPLE 2

To a suitable 4 necked, round botton reaction vessel equipped with an agitator, a nitrogen inlet and outlet and a reflux condenser connected to a caustic scrubber are added 130 parts of acrylamide, 357 parts of deionized water and 127 parts of 25% aqueous solution of methacrylamidotrimethyl ammonium chloride. The pH is adjusted to 4.0+0.2 with 10% sulfuric acid. The solution is stirred at 25°–30° C. and sparged with nitrogen for one hour. The sparge tube is raised and a nitrogen blanket is maintained over the surface. Disodium ethylenediaminetetraacetic acid is added followed by 2-mercaptoethanol (14.4 parts) by syringe through a serum cap. Ammonium persulfate (3.2 parts in deionized water) is added rapidly by syringe to the agitated solution. An immediate exotherm takes place. The reaction is then kept at 80° C. by external heating for two hours. A second charge of ammonium persulfate (1.6 parts in nitrogen sparged deionized water, 25 parts) is added to complete the reaction. The batch is maintained at 80° C. for one additional hour and is then cooled to 25° C. The resultant copolymer has a molecular weight of 4000.

To the above copolymer at 25° C. are added 40% aqueous glyoxal (128 parts) and then 10% NaOH (40 parts) to bring the pH to 8.2. The reaction is kept at 25° C. while the Gardner-Holt viscosity is monitored. Increments of 10% NaOH are added to the well agitated batch to keep the pH at 8.2 until a Gardner-Holt viscosity of B− is attained. The pH is then adjusted with 10% H$_2$SO$_4$ to 7.5. When the Gardner-Holt viscosity reaches B+ the reaction is terminated by addition of H$_2$SO$_4$ to reduce the pH to 3.0+0.2. Testing results as per Example 1, are set forth in Table II, below.

TABLE II

| | Dosage | Tensile Wet Strength | | |
| Resin | (lb/T) | Immediate | 16 hr. Soak | % Decay |
|---|---|---|---|---|
| Example 1 | 10 | 3.97 | 1.01 | 75.6 |
| Commercially available resin produced as in U.S. 3,556,932 | 5 | 3.34 | 1.56 | 53.3 |

EXAMPLE 3

A suitable three necked reaction vessel, equipped with a reflux condensor, thermometer, mechanical stirrer and 2 serum caps, is charged with 33.10 parts of 59.8% diallyl dimethyl ammonium chloride and 11.21 parts of water. The reaction solution is heated to reflux and maintained at this temperature during the course of the reaction. Over the next 1.5 hours are added the following reagents in separate streams: 161.41 parts of 49% acrylamide, 26.09 parts of water, 0.07 part of ethylenediaminetetraacetic acid, disodium salt; 2.22 parts of ammonium persulfate in 10.30 parts of water and 7.81 parts of sodium metabisulfite in 18.17 parts of water. After completion of addition, heating and refluxing continues for 2 hours. At room temperature, the pH is adjusted to 3.0+0.2. The molecular weight of the resultant copolymer is 5520.

Glyoxlation

At ambient temperatures, a suitable reaction vessel is charged with 20.05 parts of the above copolymer backbone, 5.96 parts of 40% glyoxal and 12.92 parts of water. The pH is adjusted to and maintained at 8.0 with 10% sodium hydroxide. The viscosity is monitored using a Gardner Bubble viscometer. When a viscosity of "C" is achieved, the reaction is quenched by judicious addition of 10% HCl to a pH of 3.5. Again following the testing procedures of Example 1, the results set forth in Table III, are recorded.

TABLE III

| Resin | Dosage lb/T | Tensile - Wet Strength | | % Decay |
|---|---|---|---|---|
| | | Immediate | 16 Hour Soak | |
| Commercially available resin as in U.S. 3,556,932 | 5 | 2.80 | 1.13 | 59.6 |
| Example 3 | 10 | 2.32 | 0.70 | 69.8 |
| | 20 | 2.84 | 0.83 | 70.8 |

EXAMPLE 4

Resin prepared according to the teachings of U.S. Pat. No. 3,556,932, based on an average of over 30 resins, gives the following Handsheet Testing Data:

| Dose | Tensile - Wet Strength | | % Decay |
|---|---|---|---|
| | Immediate | 16 Hour Soak | |
| 5 | 3.28 | 1.56 | 52.4 |

EXAMPLE 5

Copolymer Backbone

A suitable 3-necked reaction vessel equipped with a Claisen adaptor, reflux condensor, thermometer, mechanical stirrer and argon sparger is charged with 192.7 parts of 49% acrylamide, 243.8 parts of deionized water and 39.47 parts of 59.8% diallyldimethyl ammonium chloride. The pH is adjusted to 4.0+0.2 with 10% $H_2SO_4$. The stirring solution is then sparged with argon. After 50 minutes, 10.6 part of hydroxyethyl-3-mercaptopropionate are added. Ammonium persulfate (2.36 parts) in 17.71 parts of deionized, sparged water is charged to the vessel at the end of 10 minutes. Within eight minutes an exotherm peaks at 70° C. Temperature is maintained at 72° C. for the remainder of the reaction by means of a heating bath. One hour after initial catalyst addition, a booster catalyst of 2.36 parts of ammonium persulfate in 17.72 parts of sparged, deionized water is added over a one hour period. The reaction mixture is then cooled and used in the next step. The copolymer's molecular weight is 1700.

Glyoxalation

A suitable reaction vessel is charged with 25.02 parts of the above copolymer backbone, 4.37 parts of 40% glyoxal and 0.14 part of deionized water. The pH is adjusted to 8.0 with 10% NaOH while stirring. Viscosity is monitored with a Gardner Bubble Viscometer. When a viscosity of C is achieved, the reaction is quenched with 10% $H_2SO_4$ to pH 3.3+0.2. The testing procedures of Example 1 are again followed. The results are set forth in Table IV, below.

TABLE IV

| Resin | Dose (lb/T) | Tensiles (lb/in) | | % Decay |
|---|---|---|---|---|
| | | Immediate | 16 Hour Soak | |
| Commercially available resin produced as in U.S. 3,556,932 | 5 | 2.68 | 1.31 | 51.1 |
| Example 5 | 10 | 2.93 | 1.07 | 63.5 |
| | 20 | 4.01 | 1.45 | 63.8 |

EXAMPLE 6

When the diallyldimethyl ammonium chloride of Example 1 is replaced by an equivalent amount of methylvinyl pyridine, similar results are achieved.

EXAMPLE 7

The procedure of Example 1 is again followed except that 2%, by weight, of the acrylamide is replaced by acrylic acid, all else remaining equal. Again, excellent results are achieved.

We claim:

1. A glyoxylated cationic, water-soluble acrylamide polymer containing (a) from about 70–99%, by weight, of an acrylamide and (b) from about 1–30%, by weight, of a cationic monomer or mixture of cationic monomers copolymerizable with said acrylamide, up to about 10%, by weight, of said acrylamide being replaced by (c) a different comonomer than (b) copolymerizable with said acrylamide, the amount of said (c) being less than said (b) if said (c) is anionic, said acrylamide copolymer having a molecular weight ranging from about 500 to about 6000 before glyoxylation, and having sufficient glyoxal-reactive amide substituents and —$CH_0H$—CHO substituents to be thermosetting, the ratio of glyoxol units to acrylamide units ranging from about 0.1–0.5:1.0.

2. A polymer according to claim 1 wherein said acrylamide is acrylamide.

3. A polymer according to claim 1 wherein said cationic comonomer is diallyl-dimethylammonium chloride.

4. A polymer according to claim 1 wherein said cationic comonomer is methacrylamido-trimethyl ammonium chloride.

5. The polymer of claim 1 in colloidal state.

6. A polymer according to claim 1 wherein the molecular weight thereof ranges between about 1000 to about 4000.

* * * * *